United States Patent [19]

Mix

[11] Patent Number: 5,206,987

[45] Date of Patent: May 4, 1993

[54] BATTERY ASSEMBLY PROCESS

[75] Inventor: Renard E. Mix, Yorktown, Ind.

[73] Assignee: General Motors Corporation, Detroit, Mich.

[21] Appl. No.: 926,440

[22] Filed: Aug. 10, 1992

[51] Int. Cl.[5] .............................................. H01M 2/26
[52] U.S. Cl. .............................. 29/623.1; 164/DIG. 1
[58] Field of Search .............. 29/623.1; 429/160, 161; 164/DIG. 1; 228/58, 901

[56] References Cited

U.S. PATENT DOCUMENTS

| | | | |
|---|---|---|---|
| 2,287,802 | 6/1942 | Hill | 29/623.1 |
| 3,841,915 | 10/1974 | Eberle | 429/160 |
| 3,988,169 | 10/1976 | McLean | 29/623.1 |
| 4,742,611 | 5/1988 | Meadows et al. | 29/623.1 |
| 4,800,142 | 1/1989 | Bish et al. | 429/160 X |

FOREIGN PATENT DOCUMENTS 1321279  6/1973  United Kingdom .

Primary Examiner—Anthony Skapars
Attorney, Agent, or Firm—Lawrence B. Plant

[57] ABSTRACT

Method and apparatus for joining lead battery parts (e.g., plate lugs, intercell connectors, terminals, etc.) together via a low resistance electrical coupling wherein substantially oxide-free, arc-melted, superheated molten lead is cast into a cavity between the parts. The parts are shielded from the arc while being bathed in a non-oxidizing atmosphere which is preferably formed from an ionizable, non-oxidizing gas heated by the lead-melting arc and spewed onto the parts along with the molten lead to provide additional heat thereto.

9 Claims, 3 Drawing Sheets

BATTERY ASSEMBLY PROCESS

This invention relates to the manufacture of lead-acid storage batteries and particularly to the joining of adjacent cell elements together therein by casting a lead connector therebetween.

BACKGROUND OF THE INVENTION

Lead-acid storage batteries comprise several galvanic cell elements each encased in separate compartments of a substantially leak-proof, thermoplastic container containing sulfuric acid electrolyte. Each cell element typically comprises at least one plate-like, positive electrode (i.e., positive plate), one plate-like negative electrode (i.e., negative plate) and a porous separator (e.g., a thin microporous sheet and/or absorbent glass mat) therebetween. Multi-plate cell elements are commonplace and comprise a stack of alternating positive and negative polarity plates interleaved one with the other and the separators. The plates themselves each comprise a conductive substrate which supports an electrochemically active material thereon and conducts electrical current substantially uniformly therethrough. In Pb-acid batteries, the plates comprise a leady active material (i.e., $PbO_2$ for the positive plates and Pb for the negative plates) pasted onto a reticulated Pb-alloy (e.g., Pb-Ca-Sn or Pb-Sb) grid substrate. A lug projects from each grid and serves to electrically couple its associated plate to other electrical components of the battery. For example, aligned lugs of like polarity plates of a multi-plate cell element are commonly electrically coupled one to the other and to intercell connectors or terminals by a so-called plate strap which is typically burned to, or cast about, the plates' lugs. Heretofore, essentially four techniques have been proposed to make such plate straps.

In the first technique, comb-like iron tooling is interdigitated with the lugs to form a mold around and between the lugs, a pre-cast plate strap having a plurality of toes is interdigitated with the plate lugs in the mold and burned to the plate lugs by means of a gas torch applied directly thereto. Thereafter, the tooling is withdrawn. This technique has been used commercially for many years.

In the second technique, upstanding plate lugs are enclosed in a mold similar to that described above and molten lead poured into the mold to form the plate strap. This technique never achieved widespread, if any, commercial use presumably owing to the inability to reliably implement such a process on a production scale. In this regard, metal which was poured into the mold at a single site was expected to spread uniformly throughout the mold (i.e., in and around the upstanding plate lugs) and still bond well to the lugs. However, non-uniform distribution of the lead in the mold as well as non-uniform cooling of the melt usually occurred and resulted in poor quality, high resistance connections between the plate lugs and plate strap.

A third technique is a variation of the second wherein an open-topped mold is first filled with a predetermined amount of molten lead and thereafter the plate lugs of an inverted cell element are immersed therein. The solidified strap is subsequently removed from the mold, the cell element returned to its upright position and finally inserted into a battery container. The aforesaid third technique substantially eliminated the non-uniform flow, cooling and heat distribution problems of the second technique and has been used commercially for many years. However, it too has disadvantages. In this regard, commercial practice of this technique requires the use of a melting/holding furnace containing a large supply of molten lead ready for pouring, as well as an associated plumbing network of melt delivery pipes, valves, nozzles, etc. This complicated assemblage of melt handling equipment is cumbersome, requires considerable maintenance and has to be kept hot at all times even when plate straps are not being cast. The heat required to melt and keep large quantities of lead molten, as well as keep the melts' delivery plumbing hot, not only results in a costly consumption of energy but radiates into the work area making it a less desirable operator working environment. Moreover, the maximum practical temperature useful with such prior "cast-on-strap" techniques was effectively limited to about 850° F. above which untoward oxidation of the molten lead occurs which tends to cause equipment fouling and result in oxide inclusions in the casting. Moreover, experience has shown that the equipment commercially available for metering and delivering the lead into the molds by those techniques is not capable of consistently casting plate straps of the exact same size. Rather, the mass of the plate straps varies significantly one from another over the course of a production run. As a result, in order to insure that each and every plate strap has at least the minimum amount of lead necessary for current conduction and strength it is common practice to purposely set the delivery equipment to dispense more lead (often as much as 30% more) into the molds than is theoretically necessary. Hence, many straps are cast with more lead than needed which results not only in heavier batteries but considerable excess cost.

The fourth technique is described in U.S. Pat. Meadows et al No. 4,742,611, which is incorporated herein by reference, and wherein plate lugs in one cell element are joined to each other and to plate lugs in the next adjacent cell element by substantially oxide-free, arc-melted, molten lead cast about the lugs and through an open topped slot formed in the upper edge of an intercell partition which separates the two cell elements from each other. The lugs themselves are shielded from the arc while being bathed in a heated non-oxidizing gas emanating from the arc generator which reduces oxide formation and aids in maintaining the temperature of the melt zone. While the technique of Meadows et al No. 4,742,611 makes an excellent low resistance connection between the lugs and the cell elements, the slot/opening above the intercell connecting portion of the straps needs to be sealed closed to prevent electrolyte leakage between adjacent cells. This sealing/closure step adds to the complexity and cost of the process and provide another site where possible leakage can occur.

It is an object of the present invention to eliminate the extra slot-sealing/closure step required by Meadows et al while otherwise providing all of the benefits of such process. This and other objects and advantages of this invention will become more readily apparent from the detailed description thereof which follows.

DESCRIPTION OF THE INVENTION

The present invention is an improvement to the process of Meadows et al No. 4,742,611 wherein the opening in the partition is enclosed (i.e., surrounded by partition material), and in the vicinity thereof, the temperature of the molten metal stream is changed (i.e., raised or lowered as appropriate), and the dispenser caused to linger. Essentially, (1) the enclosed opening will reside beneath a bridge portion of the partition which overlies the opening, (2) the temperature will be increased when the dispenser moves from smaller lugs to larger lugs and vice versa, and (3) lingering of the dispenser in the vicinity of the opening insures that sufficient molten metal is available thereat to completely fill the opening and bridge the gap between the lugs of each set which are proximate the partition. Lingering may be accomplished in a number of ways such as (1) slowing the speed of the dispenser, (2) intermittently stopping the moement of the dispenser, (3) tracing a more tortuous path with the dispenser parallel and adjacent to the partition wall, or (4) combinations of the aforesaid.

More specifically, the method of the present invention comprehends the indirect application of a gas tungsten arc to provide heated gas and substantially oxide-free, lead melt for electrically joining lead battery plate lugs and straps through an enclosed opening in a battery intercell partition which opening lies beneath the upper edge of the partition and is completely surrounded by partition material. The method of the present invention: (1) simply and conveniently provides molten lead on demand from a solid source thereof without any unnecessary energy consumption or generation of waste heat; (2) is capable of concurrently providing streams of (a) superheated, substantially oxide-free lead and (b) non-oxidizing gases at temperatures of about 300° F.–400° F.; and (3) as part of a substantially continuous pouring operation, completely fills and seals off the intercell opening thereby eliminating the need for a separate sealing operation. The method of the present invention is particularly applicable to connecting a set of aligned, upstanding, like-polarity, lead-acid storage battery plate lugs to each other in a cell element, and to connect such cell element to an adjacent cell element in a single operation via an intercell connector concurrently formed in an enclosed opening in an intercell partition separating adjacent cell compartments of a battery container.

In a preferred embodiment of the process of the present invention, a trough (i.e., elongated mold) is formed about each set of aligned lugs for receiving and shaping molten lead dispensed therein. The troughs are aligned with each other on opposite sides of the intercell opening through which the intercell connector will be formed. The term "lead" as used herein is intended to include not only pure lead but also lead alloys typically found in Pb-acid batteries e.g., Sb, Sn, As, Al, Ca, etc. An appropriate flux, such as dissolved and dehydrated azelaic acid is applied to the lugs either before or after they are positioned in the trough. The flux cleans the lugs and agitates the melt thereby promoting better melting of the lugs. The trough may be of the "permanent" or "temporary" type. A "permanent" trough is one which remains with the cell element throughout its life such as disclosed in U.S. Pat. No. 4,742,611 or shown in FIG. 6 of this application. A "temporary" trough is one which is typically formed by separate tooling means positioned about the lugs only during pouring and solidification, and which is subsequently removed after the lead solidifies. During casting, the length of the troughs are traversed from one end to the other with an arc-melting and molten lead dispensing device such as described in Meadows et al No. 4,742,611. Such a device comprises: a substantially nonconsumable electrode for generating an electric arc; means for supplying an ionizable, non-oxidizing gas (e.g., Ar, Ar+$H_2$, He, etc.) to the arc; means for shielding the lugs in the troughs from the electric arc; means for feeding a continuous length (e.g., wire) of solid lead into the arc for melting therein; and means for directing a stream of superheated molten lead formed in the arc into the trough surrounding the lugs.

In operation, a substantially continuous length of lead wire is fed into the arc generated by the electrode at a rate commensurate with the rate at which the dispensing means traverses the trough so as to provide a substantially continuous stream of superheated, substantially oxide-free melt sufficient to melt and encompass the lugs in the trough by the time the dispensing means reaches the end thereof. The arc itself is generated in an ionizable, non oxidizing gas which supports the arc while at the same time prevents oxidation of the ultra-hot molten lead formed therein. Similarly, the trough is blanketed with a substantially non-oxidizing gas so as to prevent oxidation of the cooler, but nonetheless vulnerable, melt therein. The non-oxidizing gas which blankets the trough may be supplied separately from the arc-supporting gas. Preferably, however, arc-supporting gas which has been heated by the arc is caused to exit the dispensing device so as to impinge directly onto the lugs thereby not only providing a non-oxidizing atmosphere but also adding significant additional heat to the lugs therein for facilitating the melting and amalgamation thereof with the arc-melted molten lead.

The arc-melting and dispensing device preferably includes a housing defining a melting chamber surrounding the arc which is pressurized by the ionizable, non-oxidizing gas so as to prevent the influx of air to the melting zone where the ultra-hot molten lead is most vulnerable to oxidation. The housing carries a nozzle which, (1) directs the stream of molten lead into the trough, while protecting it from oxidation as it moves from the arc into the trough; and (2) directs ionizable, non-oxidizing gas, which has been heated by the arc, directly down onto the lugs so as to add significant additional heat thereto to promote a more rapid amalgamation of the lugs with the arc-melted lead stream. The heated gases exiting the nozzle will preferably be of sufficient quantity to substantially blanket the trough therewith and thereby obviate the need for a secondary source of non-oxidizing gas to protect the melt in the trough.

The process of the present invention forms plate straps on two adjacent cell elements as well as an intercell connector therebetween in a single traversing movement. In this regard, the troughs about the lugs of each cell element are aligned on opposite sides of an enclosed opening formed beneath the top edge of an intercell partition separating the cell elements and together form a substantially continuous trough for receiving the superheated arc-melted lead. The region of the partition contiguous the partition opening may be thickened to serve as a heat sink to mitigate any deleterious effects the molten lead might have on the partition material surrounding the opening. The cross-sectional area of the opening will be somewhat smaller than the cross-section of the plate strap such that the ends of each plate strap contiquous the opening will abut portions of the partition surrounding the opening (i.e., at least on the bottom and sides thereof) which, coupled with the metal filling the aperture, further serve to seal the opening against leakage.

In accordance with the present invention, the molten lead is dispensed into the first trough at a first temperature with the dispenser moving in a zig-zag route over the lugs at a first trough-filling speed which is determined by the flow rate of the lead from the dispenser, the mass of the lugs in the first trough and the desired size of the plate strap. In the vicinity of the intercell opening, the net rate of progress of the dispenser is retarded to provide sufficient lead to fill the openings and the space between the lugs immediately adjacent thereto (i.e., the proximal lugs). Likewise, the temperature of the molten metal stream is changed in the vicinity of the opening—upwardly if the dispenser is traveling from the negative lug set toward the positive lug set and downwardly if it is traveling from the positive lug set toward the negative lug set as will be discussed in more detail hereinafter. Finally, the dispenser is moved rapidly (i.e., much faster than the trough-filling speed) from one side of the partition to the other while the molten lead continues to flow. This rapid movement avoids any thermal damage to the thermoplastic bridge of partition material overlying the opening. The trough on the other side of the opening is then filled in essentially the same manner as the first trough was filled.

SPECIFIC EMBODIMENTS OF THE INVENTION

The invention will better be understood when considered in the light of the detailed description of certain specific embodiments thereof which is given hereafter in conjunction with the several Figures in which.

Figure 1:
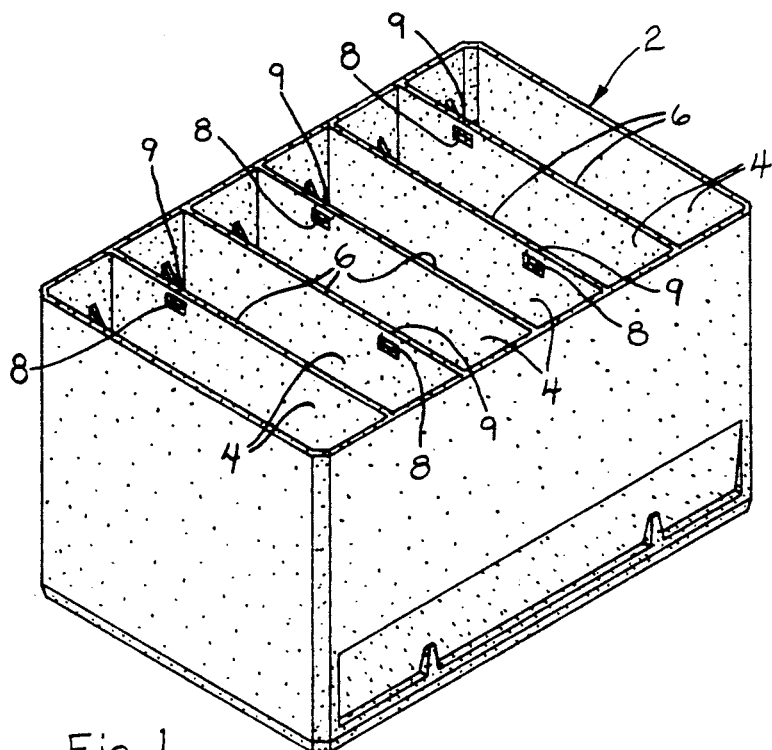
FIG. 1 is a perspective view of an uncovered, thermoplastic battery container.

FIG. 1 depicts a battery container 2 having a plurality of cell compartments 4 for receiving cell elements which, in turn, comprise a plurality of positive and negative polarity plates alternately interleaved one with the other and with appropriate interplate separators as is well known in the art. The several compartments 4 are separated one from the other by intercell partitions 6 which include enclosed openings 8 underlying the upper edges thereof for receiving intercell connectors formed in situ therein. The openings 8 are separated from the upper edge of the partition by a bridge portion 9 of the partition 6.

Figure 2:
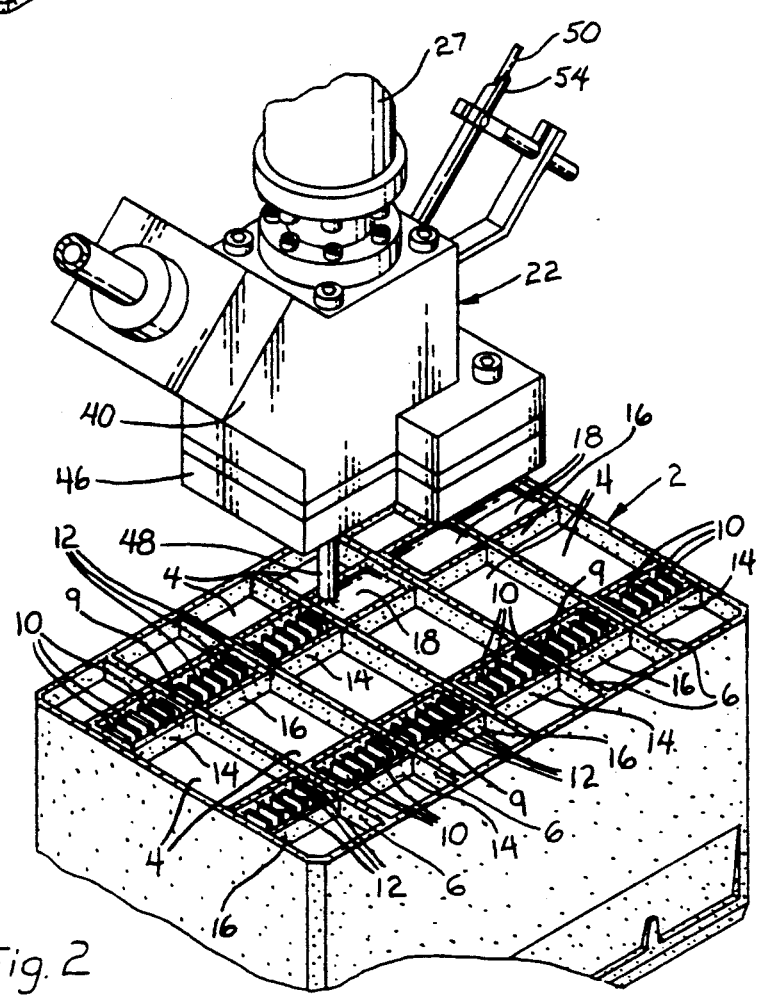
FIG. 2 is a perspective view of the battery container of FIG. 1 illustrating a method of assembling cell elements in accordance with one aspect of the present invention.
Figure 6:
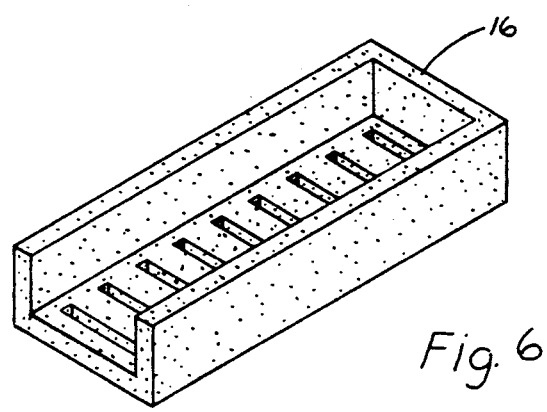
FIG. 6 is a perspective view of a preformed, permanent trough.

As shown in FIG. 2, each positive polarity plate in one cell element includes an upstanding lug 10 and each negative plate in the cell element in the next adjacent compartment includes an upstanding lug 12. The positive plate lugs 10 of one cell element are aligned with each other and with similarly aligned negative plate lugs 12 in the next cell element on opposite sides of the opening 8 in the partition 6. The positive polarity lugs 10 are surrounded by a trough 14 and the negative polarity lugs 12 are surrounded by a trough 16. The troughs 14 and 16 shown are permanent (i.e., remain with the battery) and may be of the type formed by abutting collars on each of the lugs as described in U.S. Pat. No. 4,683,180, in the names of Bish et al and assigned to the assignee of the present invention or a single piece such as shown in FIG. 6. If the troughs 14 and 16 are made from thermoplastics (e.g., polypropylene) having relatively low softening temperatures, they may be temporarily flanked by blocks of metal (not shown) to support the sides of the troughs 14 and 16 against drooping under the heat from the melt. After solidification, the blocks are removed. When higher temperature materials (e.g., polypropylene sulfide) are used, the blocks may be eliminated. The troughs may also be temporary and formed from tooling which is inserted into the container about the lugs before pouring, and later removed from the container after the plate straps and intercell connectors have been poured and solidified. Plate straps 18, as well as intercell connectors 19, are formed by dispensing a stream of arc-melted, molten lead 20 into the troughs 14 and 16 and opening 8 by traversing the length thereof with an arc-melting, molten lead dispenser 22. The opening 8 may be defined by a thickened portion of the surrounding partitions (not shown) as discussed in Meadows et al No. 4,742,611.

The lead dispenser 22, is carried by an arm 27 of a suitably programmed robot and traverses the length of the troughs 14 and 16 and opening 8 dispensing a steady stream of melt along the way. The dispenser 22 preferably follows a zig-zag pattern such that the lead stream impinges on substantially the centermost portions 28 of each of the lugs which lie inboard the ends 30 and 32 of each set of aligned lugs. The dispenser 22 travels parallel to the lugs at the ends of the plate lug sets as will be described in conjunction with FIG. 3.

Figure 5:
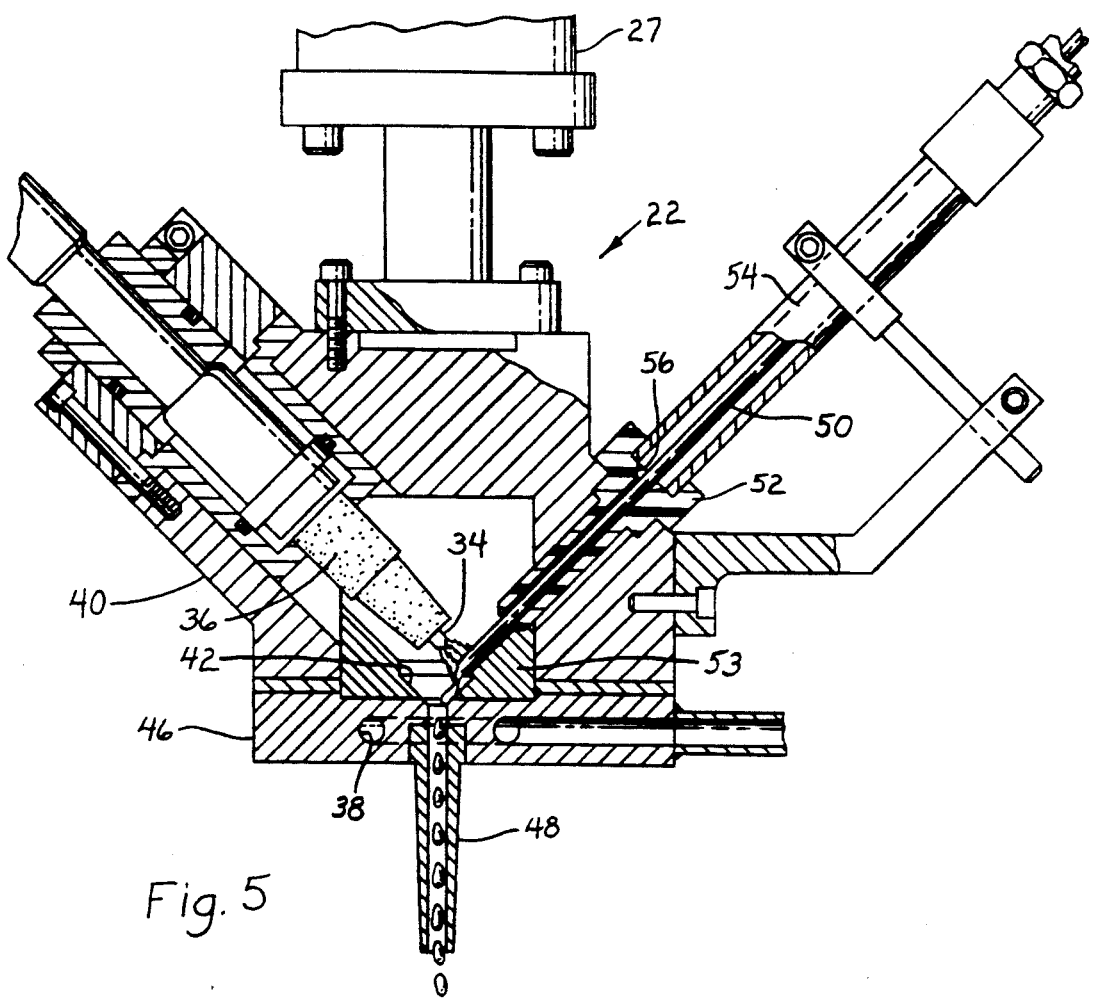
FIG. 5 is a side sectional view of an arc-melting, lead dispensing device.

The arc-melting lead dispenser 22 itself, is best shown in FIGS. 2 and 5 and comprises a central non-consumable (e.g., tungsten) electrode 34 surrounded by a ceramic tube 36 through which an ionizable, substantially non-oxidizing gas (e.g., argon, argon+$H_2$ or helium) is pumped at a rate of about 4 to about 10 CFH and at a pressure of about 5 to about 10 psi. Additional gas may also be pumped into the melting chamber 42 through the tube 54 and annular space 56 in the bushing 52 surrounding the lead wire 50. The ionizable gas supports the electric arc as is well known in the TIG welding art, while its non-oxidizing character keeps the molten lead from oxidizing at the 1500° F. or so temperature it may reach in the arc.

A metal housing 40 surrounds the electrode 34 and provides a melting chamber 42 which is filled and pressurized with the arc-supporting gas from the tube 36 and serves to contain the heat, light, and lead splatter from the arc. Coolant is circulated through cooling channel 38 in a closure plate 46 secured to the open end of the housing 40. Plate 46 includes a nozzle 48 for directing a stream of molten lead formed within the melting chamber 42 into the troughs 14 and 16 as best illustrated in FIG. 2. The closure plate 46 carries a copper-tungsten alloy (e.g., E10W) block 53 which serves as an erosion-resistant counterelectrode for the center electrode 34 for generating the Pb-melting arc therebetween.

A lead or lead alloy wire 50 is fed through an insulating (e.g., polyimide) bushing 52 substantially continuously into the arc generated by the electrode 34 in the melting chamber 42. A 3/16 inch diameter wire comprising about 3% Sb, about 2% Sn and the balance Pb and fed at a rate of about 93 inches/min. has proven effective for casting plate straps to lead-calcium-tin-plate lug alloys typically used in maintenance-free batteries. The mechanism (not shown) for feeding the wire 50 is appropriately electrically insulated from the melt dispenser 22 to insure that the lead wire 50 does not accidentally conduct the arc-forming power therethrough causing melting thereof and complete shutdown of the system.

In accordance with the present invention, the intercell connector is formed through an enclosed opening (i.e., surrounded by partition material) at the same time that the straps are poured. Sufficient lead is poured into the respective troughs that the opening is completely submerged in the strap metal such that the straps 18 on both sides of the partition 6 abut the faces 55 of the partition surrounding the opening (i.e., at least along the bottom and sides of the opening) and together with the lead 19 which fills the opening serve to seal the cell compartments 4 from each other. The dispenser lingers in the vicinity of the opening to insure that there is enough molten metal thereat to completely fill the opening 8.

Figure 3:
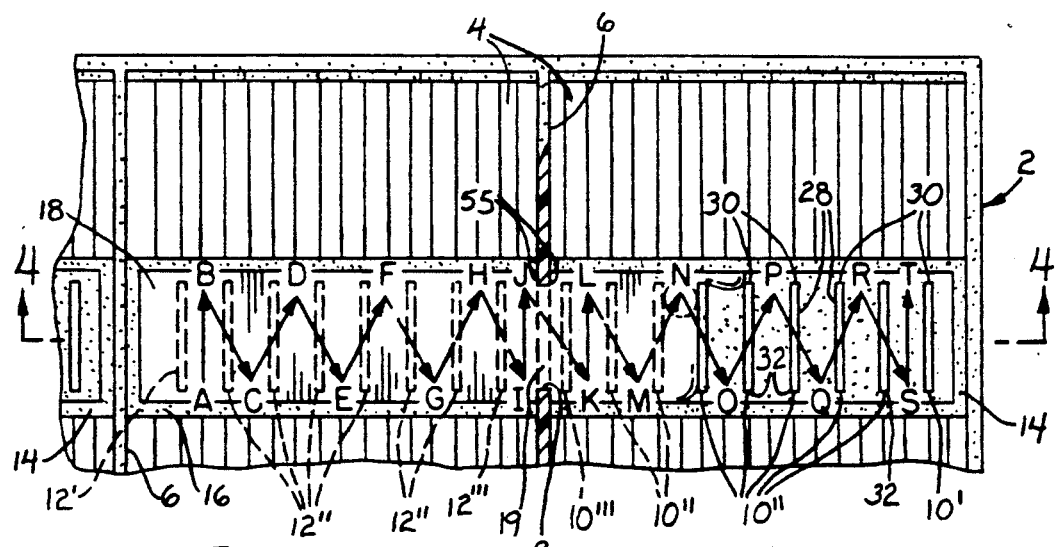
FIG. 3 is an enlarged plan view of a portion of the battery and shows a trough-traversing route of the dispensing means.
Figure 4:
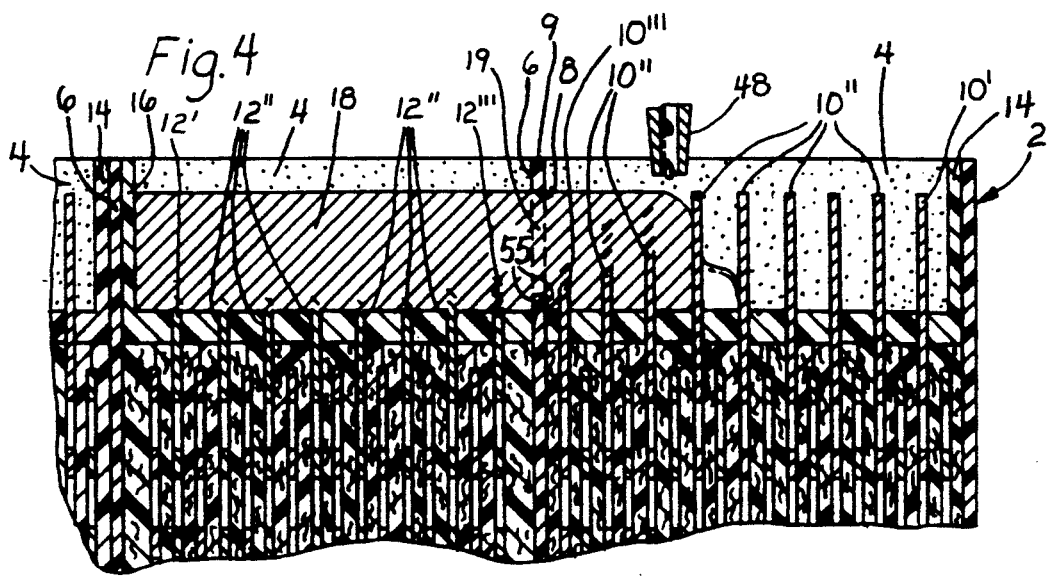
FIG. 4 is a side sectional view, in the direction 4—4 of FIG. 3 showing the lead dispensing device dispensing lead into the trough.

In accordance with one embodiment of the invention, wherein pouring begins with the negative lugs 12 and finishes with positive plate lugs 10 and with reference to FIG. 3, the nozzle 48 is lowered to a position A just above the negative distal lug 12' and the flow of molten lead begun. From there, it slowly traverses to the point B parallel to the distal lug 12'. This slow lug-paralleling motion insures sufficient heat to melt the distal lug 12' and to provide sufficient metal to fill the trough around the distal lug. In this regard, it has been found that any lug which is not crossed over and directly impinged upon by the molten lead stream requires such a lug-paralleling action in order to melt properly. At point B, the nozzle pauses for a moment and then, begins a zig-zag traverse B-I, at a faster speed than the lug-paralleling speed, crossing the top center of each of the inboard lugs 12" which lie intermediate the negative distal lug 12' and the negative proximal lug 12''' which lies adjacent the partition 6. At point I, the nozzle pauses for a moment and the temperature of the molten lead is increased (i.e., by simply increasing the amperage applied to the electrode 34) before the nozzle begins a slow traverse parallel to the negative proximal lug 12''' and adjacent the partition 6 to the point J. At point J, the nozzle pauses for a moment and then quickly elevates, quickly skips over the bridge 9 of the partition 6, and quickly descends into position K between the positive proximal lug 10''' and the next adjacent intermediate position lug 10'' in the positive lug set. By "quickly" is meant significantly faster than the zig-zag traversing speed. The speed of the nozzle 48 in relation to the lug 12''' is such as to provide sufficient molten lead on the negative side of the partition 6 for the lead to flow through the opening 8 and contact the proximal lug 10''' on the positive set of lugs. The stream of molten lead continues to flow as the nozzle 48 elevates, skips over the bridge 9 and descends on the other side. In fact, once the flow of lead begins, it will preferably continue unabated through the entire pouring sequence. The rate at which skipping occurs is sufficiently fast that the molten lead does no damage to the bridge. Alternatively, the lead flow may be momentarily discontinued as the dispenser skips over the partition. The nozzle 48 then moves slowly (i.e., less than the speed between point B and point I to point L where it pauses for a moment before starting the zig-zag traverse between points L and S at a faster speed than its K-L rate. During the traverse between points L and S, the temperature of the molten lead may be kept at about the same elevated temperature that was used in the region of the opening 8 or, preferably, slightly less than that elevated temperature. In any event, the temperature between points L and S will be higher than the temperature between points B and I. Likewise, the speed of the nozzle moving between points L and S will be lightly faster than the speed between points B and I. In this regard, the positive lugs 10 will typically be larger (e.g., ca. 20%) than the negative lugs 12 and there will typically be more positive lugs than negative lugs in each set. This larger mass of positive lugs requires (1) somewhat less molten lead to fill a trough 14 and (2) somewhat more heat to effectively melt the greater lug mass. Finally between points S and T, the nozzle moves slowly parallel to the positive distal lug 10 for the same reasons as set forth above for the movement between points A and B.

In accordance with another embodiment of the present invention, pouring begins with the positive lugs 10 first and moves toward the negative lugs 12 last. In this embodiment, and again referring to FIG. 3, pouring begins at point T and proceeds to point K at a constant nozzle speed and stream temperature. At point K the nozzle quickly elevates, skips over bridge 9 and descends to point J. At point J the temperature of the stream is dropped by about 8% and the original speed employed between points T and K resumed for the remainder of the pour. In this embodiment, more of the hotter molten lead initially from the positive lug trough 16 flows into the trough 14 through the opening 8 than occurs in the first embodiment where the negative lugs are poured first. This lead from the positive side compensates for the smaller negative lug mass in the negative trough resulting in near equal cross-section plate straps even through the lead flow rate and nozzle speed above the negative trough 14 is the same as above the positive trough 16. Reducing the temperature for the negative lugs prevents melting off of the negative lugs beneath the floor of the trough 14 which can cause separation of the plates from the lugs.

The precise parameters for any given system will of course vary with the particulars of that system. For example, product design factors affecting the choice of operating parameters include such variables as (1) the thickness of the plates and lugs, (2) the number of plates of each polarity, (3) the height of the lugs above the bottom of the trough, (4) the cross-section of the plate straps and the intercell connection, and (5) the chemical composition of the lug alloys. Likewise, process variables affecting the choice of parameters would include such things as (1) the cleanliness of the lugs and choice of flux, (2) the temperature of the molten lead, (3) the speed of the nozzle from point to point, (4) the length of each pause, and (5) the height of the nozzle over each lug.

By way of references and specific example, a battery having an eight lug negative polarity lug set and nine lug positive polarity lug set as shown in FIG. 3 has the lugs, plate straps and intercell connector poured from right to left as follows:

a. between points T and L, the dispenser travels at a speed of about 36 in./min. and the lead stream has a temperature of about $910° \pm 30°$ F.;

b. at point L, the dispenser pauses for about 1/10 sec.;

c. between points L and K, the dispenser moves at a speed of about 36 in./min. and the stream has a temperature of about 910°±30° F.;

d. at point K, the dispenser pauses for about 1/10 sec. and then quickly elevates high enough for the nozzle to clear the top of the partition (i.e., about 0.1 in.);

e. between points K and J the dispenser moves at a speed of about 80 in./min. and the stream is at a temperature of about 910°±30° F.;

f. at point J, the dispenser quickly descends and pauses for about 1/10 sec.;

g. between points J and I, the dispenser travels at a speed of about 36 in./min. with a stream temperature of about 910°±30° F.;

h. at point I, the dispenser pauses for about 1/10 sec.; and i. between points I and A, the dispenser travels at a speed of about 36 in./min. with a stream temperature of about 850°±30° F.

These conditions have been successfully used to join negative lugs which are 0.034 in. thick with positive lugs which are 0.042 in. thick and both comprised of wrought Pb-Ca-Sn alloy common to the industry. The molten metal stream flows at a rate of about 2.55 in.$^3$/min.

While the invention has been disclosed primarily in terms of specific embodiments thereof it is not intended to be limited thereto but rather only to the extent set forth in the claims which follow.

The embodiments of the invention in which an exclusive property or privilege is claimed are defined as follows:

1. In a method of joining a first set of aligned, upstanding, like-polarity, lead-acid storage battery plate lugs to each other in a first cell element and to a second set of aligned, upstanding, opposite polarity, lead-acid storage battery plate lugs in a second cell element via first and second plate straps fused to said lugs and to each other, said lug sets each having a proximal lug adjacent said opening and a distal lug remote from said opening, said elements being positioned in adjacent cell compartments of a multi-cell container and on first and second sides of an intercell partition having an opening therethrough adapted to receive an intercell connector for electrically connecting said plate straps together, comprising the principle steps of forming a trough about each set of lugs in alignment with the opening and each other, and dispensing a stream of molten lead onto the lugs in each said trough from an arc-melting, molten lead dispensing means traversing the length of said aligned trough to form said straps and said intercell connector, the improvement comprising:

said opening being enclosed by, and lying beneath the upper edge of, said partition;

with said stream at a first predetermined temperature and commencing at the distal lug of said first set, traversing said first set of lugs with said dispensing means moving in a zig-zag route over the tops of the lugs at a first trough-filling speed which is commensurate with the flow rate of the stream, the mass of the lugs of said first set and the desired dimensions of said first plate strap;

at said proximal lugs, (1) causing said dispensing means to linger adjacent said opening to permit molten lead to flow from one side of said partition to the other side through said opening to fill said opening, (2) and changing the temperature of said stream to a second temperature which is commensurate with the mass of the lugs in the second set;

moving said dispensing means quickly from one side of said partition to the other side at a speed which is greater than said trough-filling speed and sufficiently rapid as to prevent thermal degradation of said upper edge of said thermoplastic partition overlying said opening by said stream of molten lead; and with said stream at said second temperature traversing said second set of lugs with said dispensing means moving in a zig-zag route over the tops of said lugs at a trough-filling speed commensurate with the flow rate of the stream, the mass of the lugs of said second set and the desired dimensions of said second plate strap.

2. A method according to claim 1 wherein said first set of lugs are positive polarity lugs and said temperature change is a temperature reduction.

3. A method according to claim 2 wherein said temperature reduction is about an eight percent reduction.

4. A method according to claim 1 wherein said lingering of the dispensing means momentarily includes stopping the movement of the dispensing means adjacent said partition.

5. In a method of joining a first set of aligned, upstanding, negative polarity, lead-acid storage battery plate lugs to each other in a first cell element and to a second set of aligned, upstanding, positive polarity, lead-acid storage battery plate lugs in a second cell element via first and second plate straps fused to said lugs and to each other, said lug sets each having a proximal lug adjacent said opening and a distal lug remote from said opening, said elements being positioned in adjacent cell compartments of a multi-cell thermoplastic container and on first and second sides of an intercell partition having an opening therethrough adapted to receive an intercell connector for electrically connecting said plate straps together, comprising the principle steps of forming a trough about each set of lugs in alignment with the opening and each other, and dispensing a stream of molten lead onto the lugs in the trough from an arc-melting, molten lead dispensing means traversing the length of said aligned troughs to form said straps and said intercell connector, the improvement comprising:

said opening being enclosed by, and lying beneth the upper edge of said partition;

with said stream at a first predetermined temperature and commencing at the distal lug of said first set, traversing said first set of lugs with said dispensing means moving in a zig-zag route at a first trough-filling speed commensurate with the flow rate of the stream, the size of the lugs of said first set and the desired dimensions of said first plate strap;

at the proximal lug of said first set, slowing the speed of said dispensing means to a second speed which is less than said first speed and elevating the temperature of said stream above said first predetermined temperature sufficiently to melt said proximal lug and cause molten lead to flow from said first side of said partition through said opening to said second side and into contact with the proximal lug of said second set;

with said stream still flowing, moving said dispensing means from said first side of said partition to said second side of said partition at a speed which is greater than said trough-filling speed and sufficiently rapid as to prevent thermal degradation of said upper edge of said thermoplastic partition overlying said opening by said stream of molten lead;

while said dispensing means is adjacent said proximal lug of said second set and with said stream at a temperature above said first predetermined temperature, moving said dispensing means at a speed which is less than said first speed so as to melt said proximal lug of said second set and cause molten lead to flow from said second side to said first side and fill said opening; and thereafter;

traversing said second set of lugs with said dispensing means moving in a zig-zag route at a second trough-filling speed commensurate with the flow rate of the stream, the size of the lugs of said second set and the desired dimensions of said second plate strap as said dispensing means traverses the remainder of said lugs.

6. A method according to claim 5 including decreasing the temperature of said stream from said elevated temperature to a temperature which is greater than said first predetermined temperature for traversing said second set of lugs.

7. A method according to claim 5 wherein said dispensing means traverses said trough parallel to said proximal lugs.

8. A method according to claim 7 wherein said dispensing means pauses momentarily at the beginning and ending of each of said parallel traverses.

9. A method according to claim 5 wherein said dispensing means is quickly elevated from a trough-traversing level on one side of said partition, quickly skipped over the partition and is quickly lowered back down to said trough-traversing level on the other side of said partition.

* * * * *